March 19, 1929. W. H. CORBOULD 1,706,143
PROCESS OF HYDROMETALLURGICALLY TREATING
MATERIAL CONTAINING LEAD AND ZINC VALUES
Filed March 31, 1926
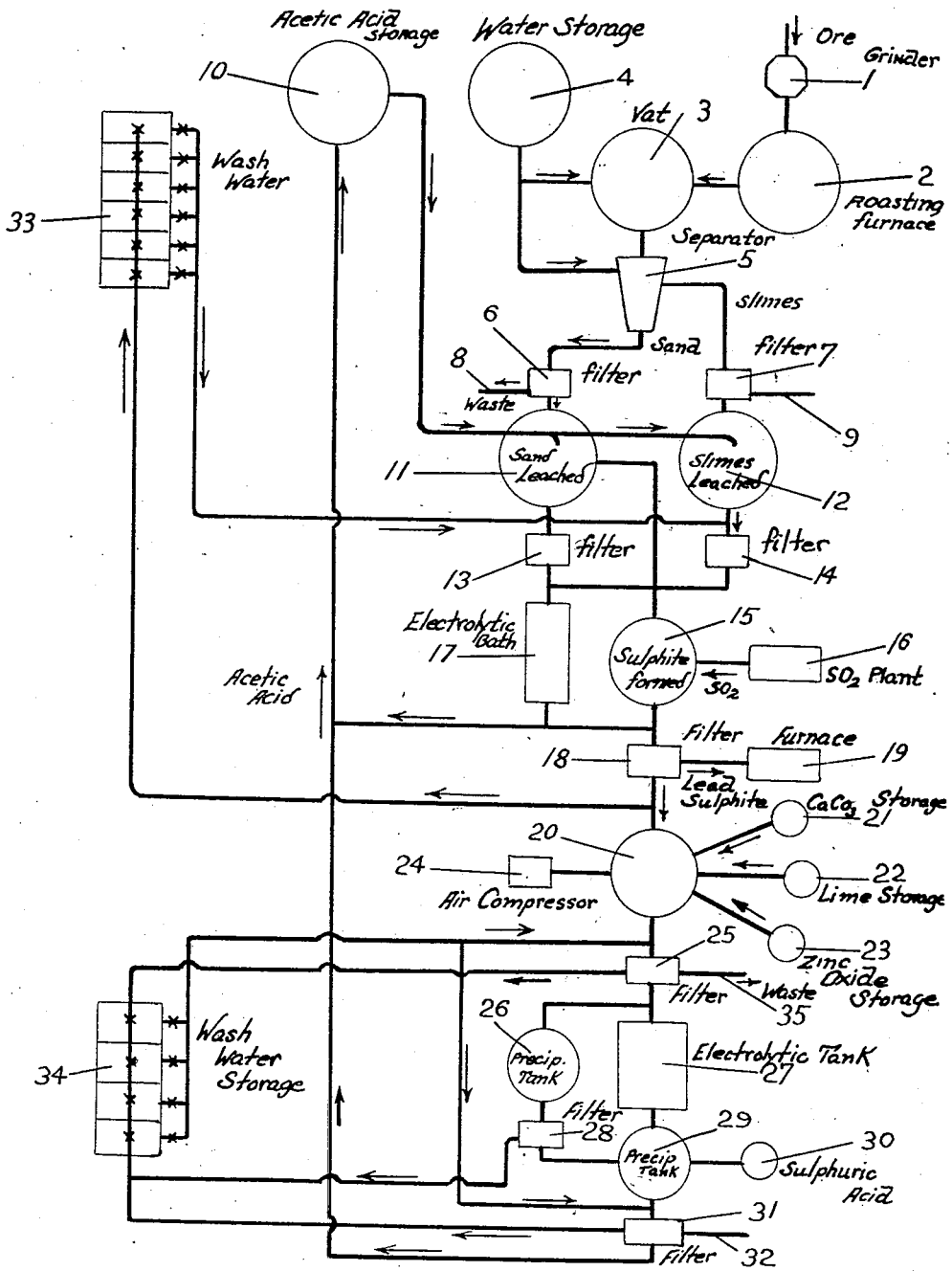
W. H. Corbould
INVENTOR
By: Marks & Clerk
Attys.

Patented Mar. 19, 1929.

1,706,143

UNITED STATES PATENT OFFICE.

WILLIAM HENRY CORBOULD, OF SYDNEY, NEW SOUTH WALES, AUSTRALIA.

PROCESS OF HYDROMETALLURGICALLY TREATING MATERIAL CONTAINING LEAD AND ZINC VALUES.

Application filed March 31, 1926, Serial No. 98,930, and in Australia July 28, 1925.

This invention relates to a process in which oxide products of lead and/or zinc, or oxidized lead ores containing zinc, or mixed oxidized or sulphide ores of lead and zinc are hydrometallurgically treated for the purpose of obtaining therefrom the metallic constituents thereof separately, or for obtaining separately a concentrated product of lead or of zinc.

In the operation of the process the material to be treated is first ground to a sufficient state of fineness. If the material should contain lead carbonate, ferrous carbonate, zinc carbonate, or sulphide of lead or sulphide of zinc, or both said sulphides, it is first roasted in a furnace in the presence of heated air at a suitable variable temperature, such temperature depending on the ore which is being treated. In such roasting, carbon dioxide and sulphur combined with the material operated on are expelled therefrom.

When operating on concentrated products of lead sulphide the sulphide of lead is roasted in a furnace at 400–550° C. when sulphide of lead is converted into sulphate of lead. Such roasted concentrates are then withdrawn from the furnace and allowed to cool when a calculated percentage of ammonium carbonate in excess is mixed therewith; the said mixture is then ground in a pan and when thoroughly subdivided and admixed, a small amount of water is added, and the grinding is continued until decomposition of the sulphate of lead is complete whereby carbonate of lead and sulphate of ammonia are formed; additional water is added and the soluble sulphate of ammonia and a little free ammonium carbonate filtered off. The residue of carbonate of lead is then given water washes to free it of sulphate of ammonia. The solution of sulphate of ammonia and wash waters are mixed together, and a little sulphuric acid is added to the mixture to decompose the free ammonium carbonate and to form sulphate of ammonia; then the whole is evaporated to dryness. The dried sulphate of ammonia is mixed with ground carbonate of lime and transferred to an iron retort, heated to redness, and the vapors of ammonium carbonate are conducted to a lead chamber, condensed and made available for another cycle of operation. The residue of carbonate of lead is now heated to about 350° C. to convert the carbonate of lead into oxide of lead.

In case the material to be treated does not contain any carbonates or sulphides it is not necessary to subject it to roasting. If, however, the material is roasted it is necessary to allow it to first cool before it is submitted to further treatment as is hereinafter described.

After the material has been ground, and, if required, also roasted and cooled, or treated as above described to obtain an oxide product, such material or the oxide product is placed in a tank and water is added thereto, whereby a thin pulp is produced. The pulped material is mechanically agitated by suitable apparatus in said tank, whereby the soluble salts thereof are dissolved, and the material may then be passed over concentrating tables or other mechanical appliance to separate it into sands and slimes.

It is to be understood, however, that the separation of the material into sands and slimes is not essential in the treatment of all materials, as, in the case of certain materials to be treated, good results can be obtained without separating the pulped material into sands and slimes, and leaching these products in separate tanks as hereinafter described; in the treatment of the particular materials referred to, it will be found sufficient to grind same to a suitable degree of fineness (in some cases it is ground to produce slimes only), and is then leached in one tank.

The method of treatment of the material which is preferred wherein the pulp is separated into sands and slimes will now be described.

The sands are fed to a filter and deprived of their surplus water. The slimes are also fed to a filter and deprived of their surplus water content. Subsequently such sands and slimes are each fed to separate leaching tanks.

The dewatered slimes in the leaching tank are then subjected to treatment by circulating a calculated solution of acetic acid in water through the slimes, whereby a thin pulp of the slimes is produced and oxides of lead and zinc carried thereby are dissolved, and acetates of lead and zinc are thereby formed. The percentage of acetic acid (100%) which is used in such treatment will be dependent on the percentage content of oxides of lead and zinc which are present in the total combined said sands and slimes. It has been found by experiment that the proportion of acetic acid usable effectively in the leaching treatment is approximately 0.3 lbs. of acetic acid to each lb. of lead oxide present, and approximately 1.5 lbs. of acetic acid to each lb. of zinc oxide present. Further, in estimating the proportion of acetic acid to be used in the leaching treatment of materials containing lead and zinc oxides separately, or both combined, together with soluble impurities such as iron, magnesia, and other acetic-acid-water soluble constituents, regard must be had to the quantity of acetic acid taken up by such impurities, and necessary proportionate quantity of acetic acid must be provided for these impurities in the solution of acetic acid in water in addition to the acetic acid required for such solution in the treatment of the oxides of lead and zinc. Such proportionate quantity of acetic acid is only determinable after a laboratory test has been made of the materials to be operated upon, whereby estimation can be made of the solubilities of such impurities.

When the lead oxide content of the slimes which are being treated has gone into solution in the leaching tank the circulation of the acetic acid water solution is stopped and the slime pulp is allowed to settle. Subsequently the clear solution so derived is filtered off, and the residue of the slimes leaching operation is water washed to free it of acetates. Should the said washed slimes residue contain payable values of gold or silver it is operated for same by any well known metallurgical method whereby the gold and silver value contents are recovered. The wash solution from the treatment of the residue of the slimes is fed to a water storage tank and is utilized later as wash water in a further (following day) cycle, whilst the clear solution from the slimes leaching operation is passed direct to the sands contained in the separate leaching tank provided therefor. Circulation of the clear solution is carried on in the charge of sands material or pulp in the leaching tank therefor until the lead and zinc oxide contents of said sands have gone into solution.

Said sands pulp is then allowed to settle, and the clear solution resulting from the settling operation is subsequently filtered off, whilst the residue thereof is washed with water containing free acetic acid, then with water only to free it of acetates. Should such washed residue contain payable values of gold or silver it is operated on by any well known metallurgical method to extract therefrom such values. The wash solution derived from water washing the said residue is passed to a storage tank for further use in another (next day) cycle of operations and the clear solution derived from the leaching of the sands pulp is fed to a precipitating tank. Said clear solution consists of soluble acetates of lead and zinc and impurities (if any).

Where the material which is being treated has not been separated into sands and slimes for the treatment of these products in separate leaching tanks, but is subjected to the leaching treatment described in one tank, the clear solution derived from such latter leaching treatment of the material is fed to the said precipitating tank.

Such clear solution in the said precipitating tank is then subjected to treatment by forcing thereinto sulphur dioxide gas with the object of precipitating from the solution the lead acetate contained therein as lead sulphite. Said treatment is continued until a part of the whole of the lead acetate is precipitated from the solution and the acetic acid of the solution is regenerated for further use in another cycle of operation. Precipitate remaining after such treatment is allowed to settle when the clear solution resulting from the settling operation is filtered off and the precipitated sulphite of lead is water washed to free it of acetates. Water wash from such operation is passed to wash water storage tank for further (next day) use. Said treatment ensures the production of pure sulphite of lead. The sulphite of lead so derived is subsequently melted out of contact with air to convert it to lead oxide and the molten mass which may also contain a small proportion of metallic lead has carbon added thereto whereby the lead content of the mass is then converted into metallic lead.

As an alternative to precipitating the whole of the lead acetate from the said clear solution as lead sulphite by means of sulphur dioxide gas the lead may be precipitated from the solution by forcing carbon dioxide gas thereinto, whereby part of the lead acetate of the solution is decomposed and carbonate of lead is thus produced. In such case the remaining lead acetate of the solution is precipitated therefrom by utilizing sulphur dioxide gas which is forced thereinto whereby sulphite of lead is produced and the acetic acid of the solution is regenerated.

As a further alternative, instead of precipitating the lead acetate from the said clear solution by sulphur dioxide gas, the said solution may be treated with sulphuric acid whereby the lead is obtainable as lead sulphate and the acetic acid of the solution is regenerated for further use.

Precipitation of the lead from the said clear acetate solution may also be effected by subjecting such solution to electrolytic treatment, whereby lead is obtained in the metallic state. In such treatment the electrolyte solution is alkaline or approximately alkaline and carbon or insoluble anodes and lead or iron or aluminium cathodes are utilized.

The clear solution derived from the settling operation of the lead sulphite precipitate produced as above described, and which consists of a solution of regenerated acetic acid and acetate of zinc, is then treated to reduce it to the neutral point with finely powdered carbonate of lime, or carbonate of barium, and subsequently it is treated to reduce it to slightly beyond neutral point with hydrated oxide of lime or barium hydrate. Atmospheric air is now injected through the said solution in presence of a calculated percentage of oxide of zinc, whereby iron and other impurities in the solution are precipitated therefrom. Should there be traces of copper present in the solution the latter (before it is neutralized) has circulated therein metallic zinc, whereby the copper is precipitated from the solution.

Subsequently the solution is filtered and the residue is water washed to free it of acetates. Said wash water is then passed to a separate wash water storage tank for further (following day) use. The clear filtered solution which consists of a neutral solution of lime and zinc acetates is operated on by electrolysis, whereby zinc is obtained in the metallic state, and the acetic acid is subsequently regenerated for further use. During electrolysis of zinc acetate acetic acid is being regenerated and lime or barium oxide is added to electrolyte to keep solution nearly neutral.

Upon the separation of the zinc from the electrolytically treated solution, the electrolyte is bye-passed and sulphuric acid is added thereto to enable precipitation therefrom of calcium or barium sulphates and the acetic acid regenerated. The regenerated acid solution upon being filtered and having acetate of lead added thereto, so that free sulphuric acid in the solution will be decomposed, is made available for use in another cycle of operation in the treatment of new material.

Instead of subjecting the clear solution derived from the settling operation of the lead sulphite precipitate to treatment as above described to obtain metallic zinc, the zinc contents of such solution may be precipitated therefrom by adding to the solution sulphuretted hydrogen gas, or a calculated percentage of calcium sulphide, or barium sulphide, whereby sulphide of zinc is produced, the latter being subsequently roasted to provide oxide of zinc.

The calcium or barium passes into solution as acetates; such solution is filtered off and has added thereto sulphuric acid whereby the calcium or barium acetates of the solution are precipitated therefrom and the acetic acid of the solution is regenerated. Or, the said clear solution derived from the settling operation of the lead sulphite precipitate may be treated to obtain oxide of zinc, by neutralizing the free acetic acid of the solution by adding to the solution powdered calcium or barium carbonate; the solution has then added to it calcium or barium hydrate, whereby the zinc contents and all impurities are precipitated from the solution as hydrates. The solution is then filtered and the filtrate has added thereto sulphuric acid to enable precipitation of calcium or barium as sulphates; the clear solution is filtered and the regenerated acetic acid solution has added thereto a small proportion of acetate of lead to decompose any excess of sulphuric acid. The resultant solution is then available for another cycle on fresh material. To residue of hydrates, ammonium hydrate is added which dissolves the hydrated zinc and zinc ammonium solution is thus produced; such solution is filtered and the filtrate is then transferred to a still, and steam injected thereinto, to drive off the ammonium hydrate, which is condensed for future use; the contents of the still are deprived of water, whereby zinc oxide is produced.

In the operation of the process it is necessary, in the washing operations of the leached material, that the first and second wash waters contain a proportion of free acetic acid, otherwise a little hydrated oxide of lead will be left with the material.

As acetic acid is miscible with water in all proportions, if the water of the acetic acid solution used in the process is likely to evaporate in the operation of the process due to the exposure of the solution of acetic acid in water to heat or wind, the tanks containing such solution should be covered, or such tanks should be provided with a movable cover having a water seal. Protection of the solution from such evaporation is not necessary when the solution has been used to act on any lime, iron, magnesia, zinc or other elements to form neutral acetates of all or any of such elements, as the evaporation in such case only results in the concentration of the solutions of acetates.

By treatment of material by the process above described, it will be found that practically all the silver and gold contents of the leached material remain therewith except when sulphate of silver has been formed in roasting of the material. In such case the roasted material is leached with hot water in place of cold water to dissolve sulphate of silver and the other soluble salts. The soluble sulphate of silver is precipitated out of solution with sodium chloride. Further, in correspondence with greater or lesser percentage of silica, iron, alumina, and other impurities which remain in the leached residue of the material originally operated on by the solution of acetic acid in water, so the gold and silver contents in the material operated on will be found to be more or less a concentrated product of gold or silver. Further, lead produced from the operation of the process is practically free of zinc and silver, and as it contains practically no impurities it is not necessary to treat it by refining methods to provide soft pig lead. Again, if electrolytic zinc is produced through the process it is of high grade and free of impurities.

Moreover, in every stage of the said process the acetic acid which is utilized therein is capable of regeneration for further use again and again in cycle of operations without any appreciable loss. The operation of the process further ensures the obtaining of a high degree of extraction of the lead and zinc contents of the material which is treated, and that the capital outlay for metallurgical plant will be less than that required for present known methods of treating the material by wet concentration, smelting and refining. Further, if costs are excessive in the provision of electric power for the electrolysis of zinc, the process herein described allows of the treatment of original material, whereby concentrated products of high grade sulphide or oxide of zinc can be made available for transportation to places where electric power costs are low.

During the operation of the process sulphur dioxide gas is set free when sulphite of lead is melted to produce oxide of lead and also when zinc sulphide is roasted to provide zinc oxide. Such gas may be utilized in the precipitation of lead sulphite from the lead acetate solution derived from the operation of the process.

Throughout this specification reference has been made to acetic acid. It is to be understood, however, that pyroligneous acid or wood vinegar may be substituted for such acid. These remarks apply also to the use of the term "acetic acid" in the appended claims.

In the accompanying drawing the operation of the process is illustrated diagrammatically, a grinding unit 1 being provided, also a suitable roasting furnace 2. A vat 3 is adapted to receive the ground material and within which soluble salts thereof may be dissolved. There is a water storage tank 4 leading to the vat 3 and also to the mechanical separating appliance 5. Sands are fed to a filter 6 and slimes to a filter 7. Water from such filters may run to waste through the connections 8 and 9 therefrom.

A tank 10 for storage of acetic acid water is connected to sands leaching tank 11 and slimes leaching tank 12, each of which is associated respectively with the filters 13 and 14. The precipitating tank 15 for lead sulphite is associated with sulphur dioxide plant 16 and if required an electrolytic tank 17 for lead production may be furnished. There is also a filter 18 associated with the tank 15 and with said filter a furnace 19 for melting lead sulphite.

The purifying tank 20 is furnished for treating clear solution from settling operation of lead sulphite precipitate, storage means 21 being provided for carbonate of lime or barium, and storage means 22 for hydrated oxide of lime or barium hydrate, and also storage means 23 for oxide of zinc. Such storage means 21, 22 and 23 together with air compressor plant 24 and filter 25 are associated with the tank 20. Waste from the filter 25 may be discharged through the connection 35.

Precipitating tank 26 or electrolytic apparatus 27 for obtaining metallic zinc can also be provided, the tank 26 having associated therewith the filter 28. Another precipitating tank 29 for calcium or barium sulphates is connected to the filter 28 and such tank 29 is also connected to storage means 30 for sulphuric acid. The tank 29 is also connected to a filter 31 having waste connection 32 for calcium or barium sulphates. There are separate series 33 and 34 of wash water storage tanks leading to separate filters where required.

What I claim as my invention and desire to secure by Letters Patent is:—

1. Process of treating materials containing lead and zinc values which comprises grinding and water pulping the material and subsequently agitating same whereby the soluble salts thereof are dissolved, removing the water from the material, leaching said dewatered material in a circulating solution of acetic acid in water whereby oxides of lead and zinc are dissolved and acetates of lead and zinc are formed, stopping the circulation of said solution and allowing the leached material pulp to settle, withdrawing the clear solution derived from said settling operation and filtering the same, water washing the material residue to free it of acetates, passing the said clear filtered solution to a precipitating tank, and treating said solution in said tank whereby at least a part of the lead acetate content thereof is converted to lead sulphite and the acetic acid of the solution is regenerated for further use.

2. Process of treating materials containing lead and zinc values which comprises grinding and water pulping the material and subsequently agitating same whereby the soluble salts thereof are dissolved and the material is separated into slimes and sands, removing the water from the sands and slimes, leaching said slimes in a circulating solution of acetic acid in water whereby oxides of lead and zinc are dissolved and acetates of lead and zinc are formed, stopping the circulation of said solution and allowing the leached slimes pulp to settle, withdrawing the clear solution derived from said settling operation and filtering the same, water washing the slimes residue to free it of acetates, passing the said filtered clear solution direct to said sands and circulating said solution in said sands whereby a pulp thereof is formed and continuing said circulation until the oxide of lead and zinc contents have dissolved, subsequently allowing said sands pulp to settle, withdrawing the clear solution from said sands pulp and filtering same, washing the sands residue to free it of acetates, passing the clear filtered solution derived from said sands pulp to a precipitating tank, and treating said solution in said tank whereby at least a part of the lead acetate content thereof is converted to lead sulphite and the acetic acid of the solution is regenerated for further use.

3. Process of treating materials, in which the acetic acid solution according to claim 1 contains approximately 0.3 lbs. of acetic acid to each lb. of lead oxide present in the material and 1.5 lbs. of acetic acid to each lb. of zinc oxide present in the material.

4. Process of treating materials according to claim 1, in which the clear filtered acetate solution is subjected to treatment in the precipitating tank by forcing sulphur dioxide gas thereinto whereby at least a part of the lead acetate content thereof is converted to lead sulphite and the acetic acid of the solution is regenerated for further use.

5. Process of treating materials in which lead sulphite is produced according to claim 1, and in which the resultant pulp from the lead sulphite production stage of the process is allowed to settle, withdrawing and filtering the clear solution derived from said settling operation, water washing the residual lead sulphite to free it of acetates and by-passing said wash water to a storage tank therefor.

6. Process of treating materials in which lead sulphite is produced according to claim 1, and in which the resultant pulp from the lead sulphite production stage of the process is allowed to settle, withdrawing and filtering the clear solution derived from said settling operation, water washing the residual lead sulphite to free it of acetates, and subsequently melting the derived lead sulphite to convert it to lead oxide, the molten mass having carbon added thereto whereby metallic lead is thus produced.

In testimony whereof I affix my signature.

WILLIAM HENRY CORBOULD.